Dec. 23, 1952     W. F. MARKLEY     2,623,094
RESILIENTLY MOUNTED SPOOL TYPE INSULATOR

Filed March 2, 1948     3 Sheets-Sheet 1

*INVENTOR.*
W. F. MARKLEY
BY
W. C. Middleton
ATTORNEY

Dec. 23, 1952 W. F. MARKLEY 2,623,094
RESILIENTLY MOUNTED SPOOL TYPE INSULATOR
Filed March 2, 1948 3 Sheets-Sheet 2

INVENTOR.
W. F. MARKLEY
BY
W. C. Middleton
ATTORNEY

Dec. 23, 1952 W. F. MARKLEY 2,623,094
RESILIENTLY MOUNTED SPOOL TYPE INSULATOR
Filed March 2, 1948 3 Sheets-Sheet 3
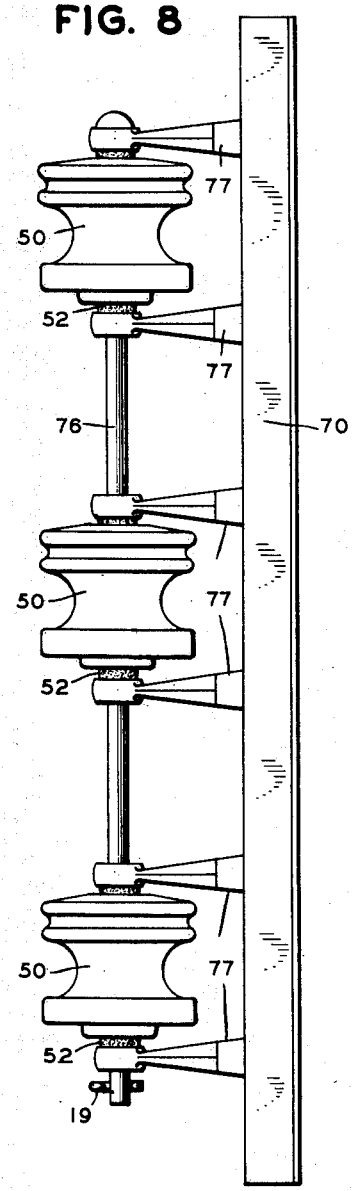
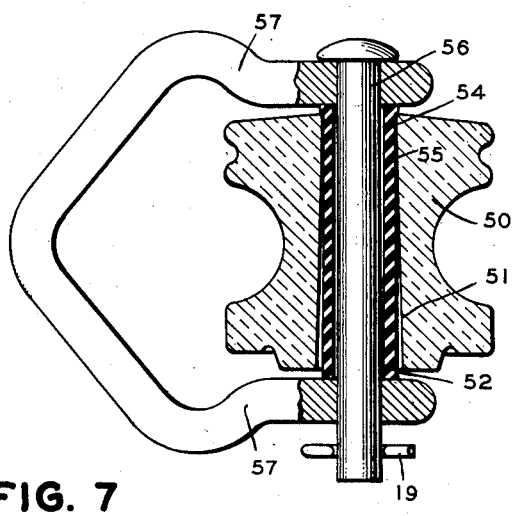
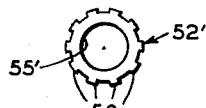
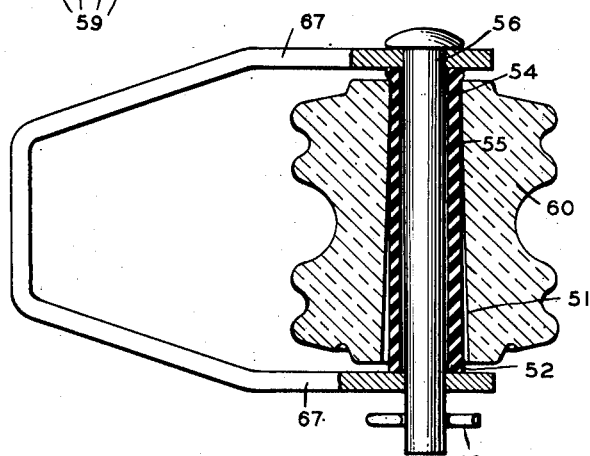
INVENTOR.
W. F. MARKLEY
BY W. C. Middleton
ATTORNEY Patented Dec. 23, 1952

2,623,094

UNITED STATES PATENT OFFICE 2,623,094

RESILIENTLY MOUNTED SPOOL TYPE INSULATOR

William F. Markley, Ridgewood, N. J., assignor to The Western Union Telegraph Company, New York, N. Y., a corporation of New York Application March 2, 1948, Serial No. 12,571

3 Claims. (Cl. 174—161)

This invention relates to insulators and more particularly to rubber bushings for insulators of vitreous composition.

Practically all insulators of vitreous material, such as glass or porcelain, used in connection with transmission or power lines are provided with a through aperture for the passage of a metal pin securing the insulators in a suitable bracket. This metal pin is the main support for the insulators and certain operating difficulties have been experienced in connection with such an arrangement.

An object of the present invention is to provide a rubber bushing for an insulator having a through opening, which bushing can be so dimensioned as to have a force fit with the insulator so that the bushing and insulator can move in unison relative to a mounting pin.

Another object of the invention is to provide a bushing as before described which has a surface contour corresponding to the contour of the through opening of an insulator and dimensioned to fit in such through opening snugly enough to permit movement of the insulator and bushing in unison.

Another object of the invention is to provide a bushing of the foregoing character of substantially tubular shape and having a tapered outer wall.

A further object of the invention is to provide a bushing of the character before described in which an external taper is provided for the major part of the bushing with an external flange at one end thereof.

Another object of the invention is to provide a bushing of the character before described in which the flange is at the top of the bushing for certain purposes or at the bottom thereof for other purposes.

A still further object of the invention is to provide a bushing which has an over-all length greater than the axial length of an insulator with which the bushing is to be associated whereby the insulator can be positioned relative to the bushing in such fashion that it is spaced from a supporting bracket both at top and bottom.

An additional object of the invention is to provide a bushing of substantially uniform tubular shape so dimensioned relative to an insulator with which it is to be associated that the bushing can be assembled in the through aperture of the insulator in such manner as to be gripped firmly by part of the wall of the insulator aperture whereby the insulator and bushing can move in unison.

In carrying out the foregoing objects of the invention a bushing is provided of suitable rubber composition and shaped to be assembled with an insulator having a through opening therein. Many insulators of vitreous material, such as glass or porcelain, have a tapered through opening and in one form of the invention a bushing may be made of such configuration as to fit close to the wall of such tapered opening with the bushing being so dimensioned that its outer surface is in effect gripped by the wall of the tapered insulator opening to such a degree as to cause the insulator and bushing to be movable in unison around or along a retaining pin passing through the bore of the bushing. In one form of the invention the bushing may have an external flange at the top end thereof which is adapted to be fitted in a counter-bore at the upper end of the insulator, such flange extending beyond the top of the insulator to prevent contact between the insulator and a mounting bracket. The other end of the tapered bushing extends below the bottom of the insulator so that contact between the bottom of the insulator and the bracket is also prevented. Brackets for mounting insulators of this type may be of various characters. In another form of the invention the external flange is provided at the bottom of the bushing forming a shelf on which the bottom of the insulator can rest while the top of the bushing extends beyond the top of the insulator. If desired, a rubber washer of the same composition as the bushing may be mounted to surround the extended upper end of the bushing and positioned to lie under the head of the retaining pin.

In another form of the invention the bushing is made of tubular rubber of substantially uniform diameter throughout its length, which length is greater than the axial length of the insulator. This bushing is so dimensioned that when it is forced into and partially through the insulator aperture, a part thereof will be compressed by the restricted wall of the insulator aperture to such a degree as to be firmly gripped by such restricted wall so that adventitious displacement of the insulator relative to the bushing is for all purposes prevented. The bushing in this instance is made of such rugged construction, and preferably with longitudinal corrugations or ribs, that the gripping before mentioned does not reduce to any material degree the diameter of the bushing bore so that the bushing and the insulator are again free for movement in unison both around or along a retaining pin passing through the bushing.

Other features, objects and advantages of the invention will become apparent by reference to the following detailed description of the accompanying drawings, wherein:

Fig. 5 is an elevation partially in section of a modified form of the invention mounted in a well known type of bracket;

Fig. 6 is a similar view of a further embodiment of the invention in a different type of bracket mounting;

Fig. 7 is an end view of a modified form of bushing; and

Fig. 8 is an elevation showing the manner in which a plurality of devices embodying the invention can be mounted in conventional gang fashion.

Figure 1:
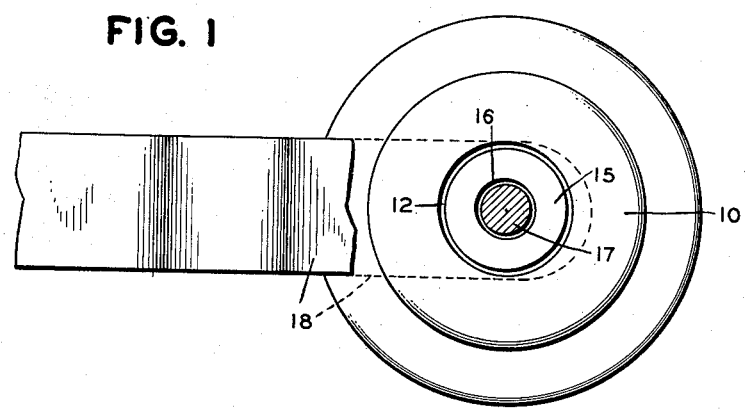
Fig. 1 is a plan view of a conventional type of stirrup mounting of an insulator construction embodying the invention with the top part of the mounting broken away for clarity.
Figure 2:
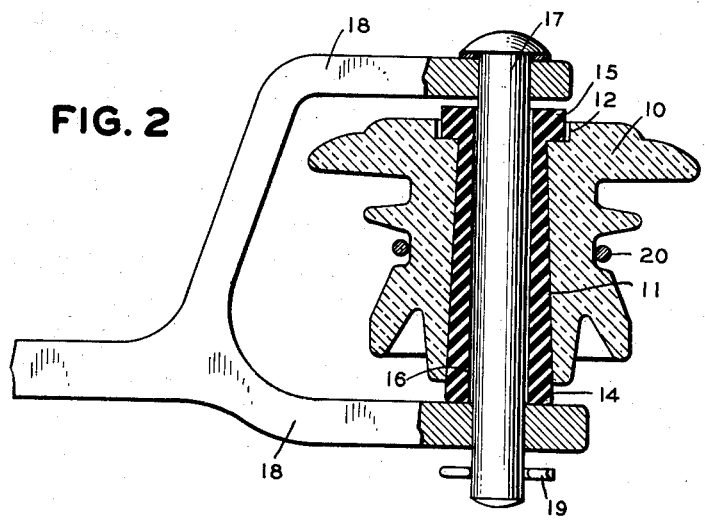
Fig. 2 is a side elevation partially in vertical section of the arrangement of Fig. 1.

Referring now to the drawings, and particularly to Figs. 1 and 2, 10 indicates an insulator made of some suitable vitreous material, such as glass or porcelain. The insulator 10 has a tapered through aperture 11 and is provided with a counter-bore 12 at the top thereof. Located within the tapered aperture 11 is a sleeve 14 of suitable rubber composition preferably a composition such as that disclosed in Smith et al. Patents 2,218,497 and 2,304,483. The rubber composition disclosed in these patents combines water-shedding characteristics with a high degree of resistance to surface leakage of electrical current under all conditions of atmospheric exposure. This material is suitable to maintain high line insulation values over long periods of time and under adverse weather conditions. As will be seen by reference to Fig. 2, the bushing 14 has an external taper over the major part thereof corresponding substantially to the taper of the through aperture 11 of insulator 10. The bushing also is provided with a flange 15 seated in and extending beyond the counter-bore 12 of the insulator. The sleeve 14 is provided with a through aperture 16 for the passage of a metallic pin 17 which passes through aligned openings in the arms 18 of a conventional stirrup mounting bracket. The pin 17 is retained in place by a cotter pin 19 passing through a hole near one end of the pin.

Bushing 14 is so dimensioned as to maintain a tight or forced fit with the wall of the through aperture of the insulator throughout the length of this wall. For this reason the bushing is of relatively massive construction requiring the same to be forced into and through the insulator aperture and, since the bushing is of rubber composition as before described, it follows that it can be compressed sufficiently to be forced downwardly through the insulator and to expand after it has been properly seated in the insulator to maintain such a fit with the insulator that the bushing and insulator can be in unison about or along the mounting pin 17. The through aperture 16 of the bushing is of such diameter as to permit and to maintain a free-riding fit on the metal pin. Thus, when an electric conductor, such as a communication line 20, is secured to the insulator, as shown in Fig. 2, it follows that the insulator and bushing can rotate about pin 17 in unison to accommodate the assembly to various line conditions. The flange 15 at the top of the bushing provides an increased leakage path from the conductor 20 to ground so that such leakage is minimized under all adverse weather conditions. A construction of this type possesses advantages over those occurring in the use of vitreous insulators alone. In the present arrangement, the rubber bushing serves effectively to prevent the conductor 20 from grounding in the event the insulator 10 becomes broken, since, should such breakage occur, the conductor 20, due to the stress of stringing the same, would rest directly on the bushing 14 and thereby would be insulated from the pin 17 and from the arms 18. This sleeve 14 also serves as mechanical reenforcement for the vitreous insulator 10 by distributing the pressure caused by the line conductor 20 and due to the elasticity of the sleeve the composite assembly is able to withstand to a higher degree than heretofore possible with vitreous insulators alone the force of impact from thrown missiles and the like. By reference to Fig. 2 it will be noted that the over-all length of the bushing is greater than the axial length of the insulator so that when the bushing is properly assembled with the insulator, a part of the bushing extends beyond the bottom edge of the insulator so that this bottom edge is maintained spaced around the lower bracket arm 18. At the same time the upper surface or edge of the insulator is maintained spaced from the upper bracket arm by the flange 15.

Figure 3:
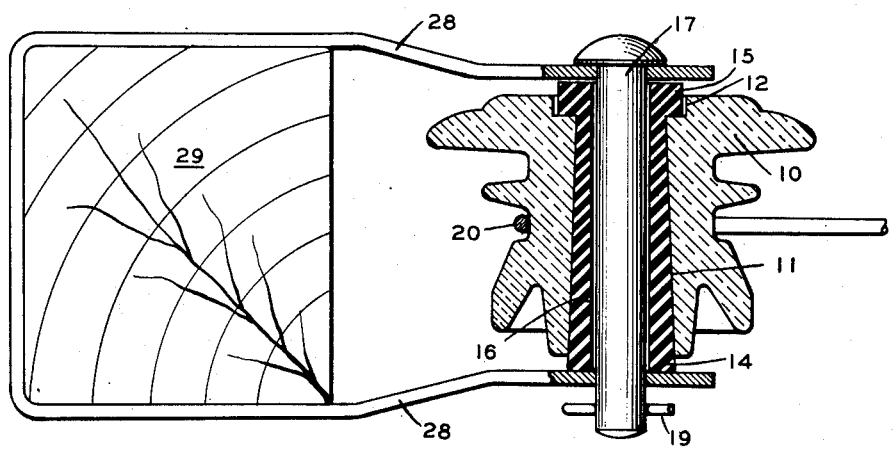
Fig. 3 shows the manner in which the insulator construction of Fig. 2 can be mounted in a dead-end type of shackle.

In Fig. 3 a similar arrangement of insulator and bushing has been shown with the exception that instead of the assembly being mounted on a bracket of the type shown in Fig. 2, the assembly is mounted in a so-called dead-end bracket made up of integral arms 28 which can be extended around a beam 29 or other supporting object such as a cross-arm. In Fig. 3 similar parts have been given the same reference characters as those applied to the Fig. 2 construction and it will be apparent that all of the advantages of the previously described arrangement are inherent in this embodiment of the invention.

Figure 4:
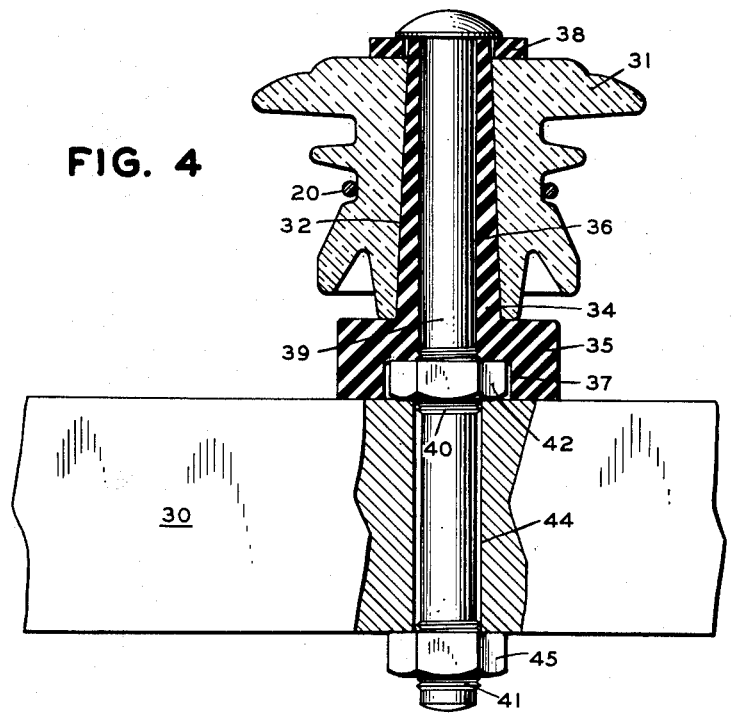
Fig. 4 is a vertical section of a modified form of the invention.

In Fig. 4 a modified form of bushing has been illustrated particularly adapted for use in connection with the assembly or mounting or insulators directly on a cross-arm 30 or the like. In this embodiment of the invention, insulator 31 is of the same general character as insulator 10 and is provided with a tapered through opening 32 similar to opening 11. However, the upper end of the insulator is not provided with a counter-bore as in the case of Figs. 2 and 3. In conjunction with such an insulator use can be made of a bushing 34, the outer wall of which has substantially the same taper as the wall of the through opening 32. This bushing 34 is provided with a bottom flange 35 and with a through opening or bore 36. The flange 35 is provided with a counter-bore 37.

In the assembly of the Fig. 4 arrangement it may be advantageous to apply a washer 38 of rubber of the same composition as the bushing 34, such washer being positioned around the upper end of the bushing after the same has been forced into and through the insulator aperture from the bottom end thereof. With the washer in place a mounting pin 39 can be passed through the bore 36 of the bushing until the head of the pin contacts the upper end of the bushing. This pin 39 is provided with external threads 40 and 41. As soon as the pin has been assembled with the insulator and bushing, the nut 42 may be brought into engagement with the threads 40 compressing the bushing between this nut and the head of the pin. It will be noted that the nut 42 is located in the counterbore 37. After such disposition of parts has been made, the lower end of the pin 39 may then be passed through an opening 44 in the cross-arm 30 and nut 45 applied to lock assembly in place relative to the cross-arm. This embodiment of the invention possesses all the advantages inherent in the construction previously described.

In Fig. 5 a further modification of the invention has been shown, such modification being adapted particularly for use in connection with insulators of the type commonly employed in power transmission lines. The insulator 50 shown in Fig. 5 has a through tapered opening 51 and is provided with a bushing 52 which is of tubular conformation with uniform internal and external diameters. The bushing 52 has an over-all length greater than the axial length of the insulator 50 so that when the bushing is forced through the insulator from bottom to top when viewed in the Fig. 5 position, excess lengths of the bushing can be arranged to extend beyond each end of the insulator. The bushing has an external diameter greater than the minimum diameter of the tapered opening 51 so that when this bushing is properly introduced in the opening 51, the restricted part of the apertured wall will compress a part of the bushing as shown at 54. The bushing, however, is made of such rugged construction that contractions of the surface thereof can be accomplished without reducing to any material extent the diameter of the bore 55 of the bushing so that the mounting pin 56, which passes through apertures in the arms 57 of a well known type of bracket, has a free riding fit within the assembly of insulator and bushing. Thus this insulator is free to rotate in unison with the bushing about the pin 56 and if the length of the bushing permits, the assembly is free for longitudinal movement also in unison. The gripping as indicated at 54 is of such extent as to insure that relative movement between the insulator and the bushing for all practical purposes is prevented.

The preferred form of bushing for this type of assembly is illustrated in Fig. 7 which portrays an end view thereof. This bushing 52' has a bore 55' but the exterior thereof instead of being smooth, as in the case of bushing 52, is provided with corrugations formed by longitudinal spaced ribs 59. When bushing 52' is assembled with an insulator, as in Fig. 5, the ribs 59 will be gripped, as at 54. The longitudinal corrugations, or ribs, introduces maximum compressibility of the bushing with minimum distortion or kinking of the bushing at the section where the bushing and insulator are in intimate contact.

An arrangement similar to Fig. 5 has been shown in Fig. 6, with the exception that the insulator 60 has a slightly different external configuration, being one of many well known types of insulators commonly used for power transmission lines. Also in this embodiment of the invention a different type of bracket has been illustrated, such bracket having substantially parallel arms 67 of integral construction for mounting the same on a suitable support. The remaining parts of the assembly are similar to those described in connection with Fig. 5 and corresponding reference characters have been applied thereto. It will be evident that the Fig. 7 bushing is also the preferred form for use in this arrangement.

In Fig. 8 illustration has been made of the manner in which a plurality of insulator assemblies similar to that of Fig. 5 can be mounted in gang fashion with a single mounting pin passing through all of the assemblies. For example, a suitable vertical support 70 has mounted thereon a plurality of arms 71 in spaced relation. The outer end of each of the arms 71 is provided with an aperture for the passage of a mounting pin 76 and if desired, insulator assemblies embodying insulators 50 and bushings 52 may be positioned between adjacent arms 71 or may be arranged with spaces between insulators as shown in the drawings. It will be apparent, however, that insulators of other configuration can be used equally well.

From the foregoing it will be seen that the present invention in all modifications illustrated and described herein provides novel and efficient bushings for insulators of vitreous material which increase the efficiency, longevity and general utility of such insulators. It will be understood that embodiments other than those illustrated herein can be made without departing from the scope of the invention which is limited only by the following claims.

What is claimed is:

1. An insulator assembly comprising an insulator, a bushing, and a mounting pin, said insulator having a longitudinal through opening, said bushing comprising a substantially tubular rubber member extending through said insulator opening and having a through opening for the passage of said mounting pin, said bushing opening having its diameter larger than the diameter of said pin to make a loose fit with said pin, said bushing having its outside diameter larger than the minimum internal diameter of the insulator through opening to cause the surface thereof to make a forced fit with the wall of the through opening of said insulator whereby said insulator and said bushing can move in unison relative to said pin, said bushing being longer than said insulator to extend beyond each end of the insulator.

2. An insulator assembly comprising an insulator, a bushing, and a mounting pin, said insulator having a longitudinal tapered-wall through aperture, said bushing comprising a substantially tubular rubber member extending through said insulator opening and having a through opening larger than said mounting pin for the passage with a loose fit of said mounting pin, said bushing having an external taper corresponding to the taper of the wall of the insulator aperture and of graduated diameters larger than the corresponding diameters of the insulator aperture to cause the surface thereof to make a forced fit with the wall of the through aperture of said insulator whereby said insulator and said bushing can move in unison relative to said pin, said bushing being longer than the insulator to extend beyond each end of the insulator.

3. An insulator assembly comprising an insulator, a bushing, and a mounting pin, said insulator having a longitudinal through opening, said bushing comprising a substantially tubular rubber member extending through said insulator opening and having a through opening larger than said mounting pin for the passage with a loose fit of said mounting pin, said bushing having its outside diameter larger than the minimum internal diameter of the insulator through opening to cause the surface thereof to make a forced fit with the wall of the through opening of said insulator whereby said insulator and said bushing can move in unison relative to said pin, said bushing having a flange at the upper end thereof to lie against the top of the insulator, and being longer than the insulator to extend beyond the bottom thereof.

WILLIAM F. MARKLEY.

REFERENCES CITED

The following references are of record in the file of this patent:

UNITED STATES PATENTS

| Number | Name | Date |
|---|---|---|
| 126,027 | Conklin | Apr. 23, 1872 |
| 268,075 | Brown | Nov. 28, 1882 |
| 848,506 | Steinberger | Mar. 26, 1907 |
| 1,712,860 | Weimar | May 14, 1929 |
| 2,324,863 | Merchant | July 20, 1943 |
| 2,437,593 | Case | Mar. 9, 1948 |

FOREIGN PATENTS

| Number | Country | Date |
|---|---|---|
| 198,742 | England | June 4, 1923 |
| 476,687 | England | Dec. 9, 1937 |
| 492,944 | Germany | Mar. 1, 1930 |